United States Patent
Ortmanns et al.

(10) Patent No.: US 8,555,150 B1
(45) Date of Patent: Oct. 8, 2013

(54) CONSTRAINT DRIVEN AUTHORING ENVIRONMENT

(75) Inventors: Kai Ortmanns, Stelle (DE); Soeren Ammedick, Neumuenster (DE); Tim Wohlberg, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 1421 days.

(21) Appl. No.: 12/129,108

(22) Filed: May 29, 2008

(51) Int. Cl.
G06F 17/00 (2006.01)

(52) U.S. Cl.
USPC .................................................... 715/203

(58) Field of Classification Search
USPC ................ 715/202, 203, 204, 243, 273
See application file for complete search history.

(56) References Cited

U.S. PATENT DOCUMENTS

| | | | | |
|---|---|---|---|---|
| 5,956,487 | A * | 9/1999 | Venkatraman et al. | 709/218 |
| 6,023,714 | A * | 2/2000 | Hill et al. | 715/235 |
| 6,300,947 | B1 * | 10/2001 | Kanevsky | 715/866 |
| 6,311,180 | B1 * | 10/2001 | Fogarty | 707/749 |
| 6,556,217 | B1 * | 4/2003 | Makipaa et al. | 345/667 |
| 7,720,932 | B2 * | 5/2010 | Wei et al. | 709/217 |
| 7,739,658 | B2 * | 6/2010 | Watson et al. | 717/108 |
| 7,813,910 | B1 * | 10/2010 | Poulin | 703/22 |
| 7,904,537 | B2 * | 3/2011 | Lim et al. | 709/223 |
| 8,010,701 | B2 * | 8/2011 | Wilkinson et al. | 709/245 |
| 8,238,833 | B1 * | 8/2012 | Mehmood et al. | 455/67.11 |
| 2002/0143821 | A1 * | 10/2002 | Jakubowski | 707/522 |
| 2005/0108692 | A1 * | 5/2005 | Lau et al. | 717/136 |
| 2005/0114445 | A1 * | 5/2005 | Tracton et al. | 709/203 |
| 2005/0124332 | A1 * | 6/2005 | Clark et al. | 455/419 |
| 2006/0025149 | A1 * | 2/2006 | Karaoguz et al. | 455/452.2 |
| 2006/0053367 | A1 * | 3/2006 | Chen et al. | 715/513 |
| 2006/0238789 | A1 * | 10/2006 | Pesar | 358/1.13 |
| 2006/0274869 | A1 * | 12/2006 | Morse | 375/352 |
| 2007/0028390 | A1 * | 2/2007 | Moriwaki et al. | 5/727 |
| 2007/0055760 | A1 * | 3/2007 | McCoy et al. | 709/223 |
| 2007/0093243 | A1 * | 4/2007 | Kapadekar et al. | 455/419 |
| 2007/0226365 | A1 * | 9/2007 | Hildreth et al. | 709/231 |
| 2007/0282954 | A1 * | 12/2007 | Kim et al. | 709/206 |
| 2008/0207182 | A1 * | 8/2008 | Maharajh et al. | 455/414.1 |
| 2009/0098914 | A1 * | 4/2009 | Martin-Cocher et al. | 455/572 |
| 2010/0076955 | A1 * | 3/2010 | Van Steenbergen et al. | 707/711 |
| 2010/0174607 | A1 * | 7/2010 | Henkin et al. | 705/14.53 |

* cited by examiner

*Primary Examiner* — Stephen Hong
*Assistant Examiner* — Matthew Ludwig
(74) *Attorney, Agent, or Firm* — Kilpatrick Townsend & Stockton LLP

(57) ABSTRACT

Techniques disclosed herein adapt a content authoring environment based on the specifications of destination electronic device for which that content is prepared. Such modification tailors features in the authoring environment to the destination device. The content authoring environment receives an identification of a destination device, such as a mobile phone, for which content is to be presented. The content authoring environment then modifies operation of itself to confirm to characteristics of the identified destination device. For example, such a modification can enable/disable authoring tools, provide device compatibility feedback in response to user content authoring, make changes to created content for device compatibility, and so forth.

23 Claims, 9 Drawing Sheets

CONSTRAINT DRIVEN AUTHORING ENVIRONMENT

RELATED APPLICATION

None.

BACKGROUND

Computer systems are capable of presenting information or content to people in a variety of ways. As an example, modern computer systems can present content to users such as playing movies or other multimedia presentations, displaying web pages, slide shows, text presentations, animations, audio or music, video games and the like. Prior to being displayed, a content developer or author creates the content using one or more software application programs that provide an authoring environment designed specifically for purposes of content creation. As an example, word processors allow an author to create text content, web page development applications provide an authoring environment to allow an author to create web pages, and multimedia authoring applications allow content authors to create video, animations, and other types of interactive content. Generally then, authoring environments are software programs that operate on computer systems and allow people (i.e. authors) to create, transform, or author creative content. Computerized authoring environments provide authoring features, elements, or toolkits within a user interface for viewing and creating content and storing such content. For example, some authoring environments provide toolkits to enable people to create content such as software application, simulations, websites, movies, audio or music or multimedia content.

Increasingly, mobile devices such as PDAs, laptops, and cellular telephones are being used for presenting content to users. Such content is anything that can be consumed by human beings—that is, something that people can view, hear, interact with, or watch. For example, such content includes games, web pages, animations, music, slideshows, video, and so forth.

SUMMARY

While conventional authoring environments provide useful tools to assist in the process of content creation, they have a few deficiencies. For example, there is no efficient way to create content compatible with multiple output devices or services. This is a concern when designing websites, for example, because there are a limited number of different types of Web browsers. This concern is more pronounced when designing content for handheld electronic devices. With respect to mobile devices such as mobile telephones or personal digital assistant (PDA) devices, there are multiple manufacturers, carriers, data networks, operating systems, display sizes, and other device features such as varying input and output mechanisms. Using the mobile phone example, screen sizes vary considerably from one phone to another and some phones have hand touch screens while other mobile phones offer a stylus for touch input. Additionally, some mobile phones have full QUERTY keyboards for input while others have only a numeric keypad and some mobile devices have more memory and/or processing power than others.

It is difficult for authors using conventional authoring environments to create a single version of content that is compatible for presentation to end-users on multiple mobile phones due to the variations in the device characteristics. In one conventional approach, an author can create content and then test the content on a target mobile phone to judge whether the content is presented and/or functions properly. In a related conventional approach, the author creates content and then tests the content on an application that can emulate multiple devices. In another conventional approach, an author prints a device specification to reference while authoring content. With all these conventional approaches to authoring content for a variety of devices, there is substantial trial and error in the content authoring process.

Techniques discussed herein significantly overcome these and other deficiencies of conventional authoring environments. For example, as will be discussed further, certain specific embodiments herein are directed to a content authoring environment (i.e. a content authoring application and/or process) that is pre-configured with operating parameters or characteristics of one or more target or destination devices for which content is being authored. In operation, a content author using the content authoring environment is able to specify the target or destination device, such as a specific manufacturer and model number of a mobile phone or PDA device, for which the content is being (or is about to be) authored. In response to identification of the destination device, the content author application as disclosed herein can access a device profile of the selected destination device and, based on this profile, can change or adjust various authoring features available to the author based on the capabilities of the selected destination device. As noted above, most destination devices have hardware and software constraints or limitations that might make certain aspects of content presentation or operation less preferred over others when content is displayed or otherwise presented on that selected destination device. Since the authoring environment as described herein allows the author to identify the destination device for which content is being authored, the content authoring environment can automatically integrate these device constraints into authoring features (e.g. menu options, tool kit selections, and the like) provided by the content authoring environment so that the author is less likely to produce content that is incompatible with the destination device. Such integration changes the authoring environment operation based on the identity of the destination device. With such device profile integration, content can be created that is compatible with a given output device. In other words, the authoring environment adapts to the abilities of a target device. The benefit is eliminating many trials and errors typically involved in creating compatible content.

With respect to a conceptual example, a word processor is an authoring environment and a desktop printer is an output device. In this example consider that the desktop printer prints only in black and white. Using the techniques disclosed herein, when an author uses the word processor, that author can specify the specific printer for which the content is being authored and in response the word processor can access a device profile for that printer that allows the authoring environment to integrate the desktop printer into authoring features presented to the user within the authoring environment. With such integration, an author attempting to change a font color to red would either not have access to color changing tools, or selecting red as a font color for text within a word processing document causes text to appear in grayscale, or the word processor displays a warning dialog box indicating that color is not compatible with the selected desktop printer which is the destination device in this example.

Techniques disclosed herein can also dynamically adapt an authoring environment based on the specifications in the target or destination device, thereby tailoring features in the authoring environment to the destination device. More specifically, according to one embodiment, a content authoring environment receives an identification of a destination device for which content is to be presented. To do so, via a user interface, the content authoring environment presents a selection of destination device types for which content is to be presented. The user can select one or more electronic devices on which content is to be presented. The content authoring environment receives a selection of at least one destination device type, and identifies a device profile that corresponds to the selected destination device type. The device profile defines characteristics of the destination device that correspond to the destination device type.

The content authoring environment then modifies operation of itself (i.e., the content authoring process changes available authoring features) based on the identification of the destination device. As an example, the content authoring environment identifies characteristics of the destination device that may be impacted during authoring of content using the content authoring environment. Such characteristics modify operation of the content offering process. The content author can modify operation of the content authoring environment in several ways. By way of a non-limiting example, graphical authoring tools are made available, or hidden, based on the capabilities of the destination device. In another example, the content authoring environment monitors content changes made by the user, and provides feedback, notifications, or messages identifying incompatible or undesirable content relative to the destination device. The content authoring environment can also modify its operation by adjusting available content authoring features to be limited to those content authoring features that enable creation of content supported by characteristics of the destination device.

The content authoring environment enables authoring content in accordance with the modified operation. The content authoring environment monitors changes to authored content that will impact the identifying characteristics. The content authoring environment can provide at least one indication to the user (i.e. the author) of the content authoring environment to indicate how changes to authored content impact the destination device for which the content is being offered. For example, an indication can tell the user that modification to the content just exceeded the memory allocation of an output device, or the output device does not have specific video support for modified content. Other indications can identify portions of authored content that are not compatible with the destination device, how authored contents impact memory usage of the destination device, or features of the destination device that do not support a portion of the authored content. With respect to memory usage, content author calculates memory consumed in the destination device in response to changes the user makes in the authored content. Content author can then dynamically display memory consumed in the destination device, relative to available memory in the destination device. Such a display can be a graphical bar or gauge, or a numerical percentage indicator.

In another embodiment, the content authoring environment modifies operation by modifying access to content authoring tools provided by the content authoring process. The tools then conform to characteristics of the destination device. By way of a non-limiting example, in an authoring environment for mobile electronic devices such authoring tools can include touch screen software features versus non-touch screen features, numeric keypad input features versus full keyboard input features, memory capacity, and screen size selection. The content authoring environment enables or disables or pre-selects such authoring features or tools within the content authoring process based on a device profile of the selected destination device for which the content is being authored. For example, if a given destination device did not support dynamic resizing of multimedia content, then the content authoring environment disables dynamic resizing tools for multimedia content. As another example, if the destination device profile indicates the destination device has a touch screen, the content authoring environment can enable a menu of features for content development that takes advantage of the touch screen.

In another embodiment, the content authoring environment receives an identification of multiple destination devices for which content is to be presented. The content authoring environment modifies access to content authoring tools to conform to the characteristics of all selected destination devices. The content authoring environment additionally adjusts operation of the content authoring tools to conform to a collective set of characteristics defined by the multiple destination devices. Such adjustment ensures compatibility of authored content on the multiple destination devices. Such adjustment provides a valuable benefit. In the example of a mobile phone, it is difficult to create content that will be compatible with multiple mobile phones because each phone has different hardware, software, display features, and available memory. The content authoring environment, for example, modifies authoring tools so that created content will be compatible with the display properties, operating platform, and available memory on each of the mobile phones.

In another embodiment, the content authoring environment imports existing content. This existing content may have been designed for use on a first type of destination device. The content authoring environment scans the existing content to identify necessary changes to the existing content to function on the first type of destination device. Existing content, for example, can be a template, a video sequence, content created in a separate authoring environment, or any other existing content. Alternatively, the content authoring environment receives an identification of a second destination device for which the existing content is to be presented. The content authoring environment identifies content elements within existing content that are not compatible with the second destination device. The content authoring environment then modifies operation of the content authoring process to enable authoring features to modify existing content to be compatible with the second destination device. The content authoring environment identifies changes to the existing content necessary to be compatible with the second destination device, or the first type of destination device. As an example, the content authoring environment can identify via graphical highlight those portions of content that are no compatible with the second destination device. The user can then make content changes to create compatible content for the second destination device.

In other embodiments, the content authoring environment is fully-featured and can execute as a process using several of the process steps described above in various combinations.

In addition to the embodiments as discussed above, other embodiments herein can include a configuration of one or more computerized devices, websites, servers, hosted services, workstations, handheld or laptop computers, or the like to carry out and/or support any or all of the method operations disclosed herein. In other words, one or more computerized devices or processors can be programmed and/or configured to include a content author and/or related functions as explained herein to carry out different embodiments of the invention.

Yet other embodiments herein include software programs to perform the steps and operations summarized above and disclosed in detail below. The content authoring environment can be a stand alone software application and process, or may be a web-based application or even a web service. One such embodiment comprises a computer program product that has a computer-readable medium (e.g., a tangible computer readable media, disparately located or commonly located media) including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes one or more computer readable media having instructions stored thereon for supporting operations such as receiving an identification of the destination device for which content is to be presented, modifying operation of the content authoring process based on the identification of the destination device, and enabling authoring of content in the content authoring process in accordance with the modified operation.

Another particular embodiment of the present disclosure is directed to a computer program product that includes a computer readable medium having instructions stored thereon for supporting operations such as authoring content to be presented on destination devices. Such instructions, and thus method as described herein, when carried out by a processor of a respective computer device, cause the processor to: (1) present a selection of destination device types for which content is to be presented; (2) receive a selection of at least one destination device type; (3) identify a device profile that corresponds to the selected destination device type, device profile defining characteristics of the destination device that correspond to the destination device type; (4) modify operation of a content authoring process based on the identification of the destination device; and (5) enable authoring of content in the content authoring process in accordance with the modified operation.

Of course, the numbering of the above steps has been added for clarity sake and is not intended to be limiting and these steps may not need to be performed in any particular order.

Also, it is to be understood that each of the systems, methods, and apparatuses herein can be embodied strictly as a software program, as a hybrid of software and hardware, or as hardware alone such as within a processor, or within an operating system or within a software application, or via a non-software application such as a person performing all or part of the operations. Example embodiments of the invention may be implemented in products and/or software applications such as those manufactured by Adobe Systems Incorporated of San Jose, Calif., USA.

As discussed above, techniques herein are well suited for use in software applications supporting authoring content for mobile electronic devices. It should be noted, however, that embodiments herein are not limited to use in such applications and that the techniques discussed herein are well suited for other content authoring systems such as those used to create content for presentation over the Internet, on full-size computer displays, on television, or in movies shown in movie theaters.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one embodiment, a content authoring environment includes a content author application and/or process that executes on a computerized device such as a personal computer and initiates display of the graphical user interface to a user who is an author of content. Via the graphical user interface, the user can select one or more destination devices (such as a mobile telephone or PDA), and create content in this content authoring environment. The content author application dynamically adapts the authoring environment based on specifications of a selected destination device. Features in the authoring environment are tailored to, or constrained to, a selected destination device. The content authoring environment thus adjusts authoring features such as available menu choices based on characteristics of the identified destination device for which the content is to be (or is being) authored. As an example, if the author selected a destination device that has robust audio, video and input features (e.g. sound co-processor, a high resolution screen and a multi-touch touch screen), the content authoring environment can identify these features in a device profile for that device and can provide access to a set of graphics, sound and input tools that allow to author of the content to produce custom content designed to take advantage of these robust features of the selected destination device. In this manner, the system disclosed herein can tailor itself to optimally provide, to the author, content creation authoring features (e.g. editing tools, audio tools, video tools, and the like) that are best suited to allow content creation for the device upon which the content is to be presented to an end-user.

Figure 1:
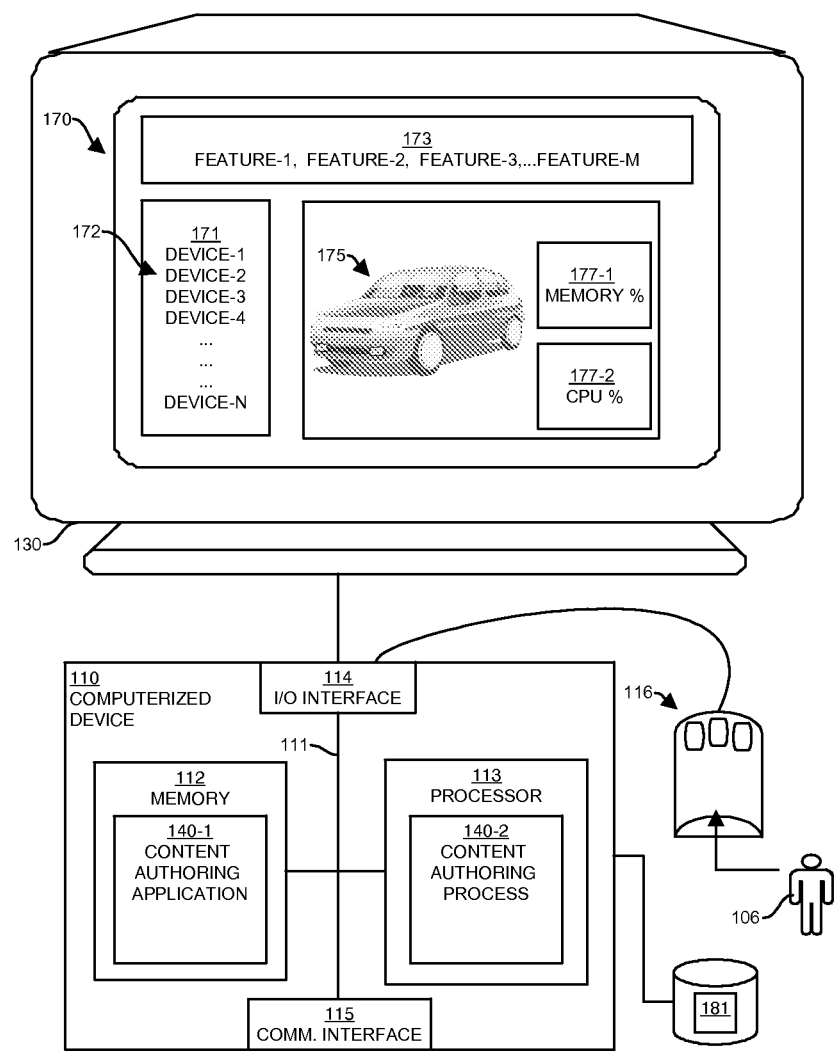
FIG. 1 is an example diagram of a content authoring environment in a computer/network environment according to embodiments herein.

Now, more specifically, FIG. 1 is a block diagram illustrating an example architecture of computer system 110 that executes, runs, interprets, operates or otherwise performs a content author application 140-1 and process 140-2 (known collectively as content authoring environment 140). The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user controlled devices such as a keyboard, mouse, stylus etc.) couples to processor 113 through I/O interface 114, and enables a user 106 to provide input commands and generally control the content that the content author application 140-1 and process 140-2 provides on the display 130. The communications interface 115 enables the computer system 110 to communicate with other devices (i.e., other computers, laptops, cellular phones, PDA's, etc.) on a network (not shown).

The memory system 112 is any type of computer readable medium and in this example is encoded with a content author application 140-1. The content author application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect mechanism 111 in order to launch, run, execute, interpret or otherwise perform the logic instructions of the content author application 140-1. Execution of the content author application 140-1 in this manner produces processing functionality in a content author process 140-2. In other words, the content author process 140-2 represents one or more portions of runtime instances of the content author application 140-1 (or the entire application 140) performing or executing within or upon the processor 113 in the computerized device 110 at runtime.

The content authoring environment 140 provides or displays a graphical user interface 170 that allows a user 106 (e.g. an author of content) to use input devices 116 (e.g. a keyboard and/or mouse) to author content 175. During operation of the graphical user interface 170, a device selection menu 171 displays a list of destination devices 172 selectable by the user 106. The content authoring environment 140 is configured with, and maintains, a respective device profiles 181 in a device profile database 180 for each device 172. The device profiles 181 exist for a variety of different possible destination devices 172 for which content may be authored by the author 106. Each destination device 172, appearing in device selection menu 171, can be any type of end-user device. In a non-limiting example, devices 172 may be a list of mobile phones or PDA devices listed by manufacturer, network provider, device features, or any other organizational convention. The set of operational characteristics of a given device 172 are maintained in that device's corresponding device profile 181.

The content authoring environment 140 provides authoring features 173 via its graphical user interface 170. The authoring features 173 include any number of content creation tools and as explained herein, are for example enabled or disabled (or displayed/not displayed) based on the characteristics of the destination device 172 that the author 106 selects (the device for which content is being created). For example, such tools 173 can include audio and video/multimedia editing tools, animation tools, color palette tools, text or image editing tools, device input tools and the like. The author 106 works in a content authoring region 174 to create the content 175 using these authoring features 173. Content 175 can be any created content such as sounds, animations, slideshows, text, navigation screens, movies, application features for an application under development, and so forth.

The content authoring environment 140 further provides the ability to monitor the creation of the content 175 to provide feedback 177-1, 177-2 to the author 106 concerning how the content 175 that is being created will impact the characteristics of the selected device 172. By way of example, if the identified destination device 172 is a mobile PDA with MPEG video playback capability and the author 106 is creating video content 175, the content authoring environment 140 can provide (e.g. execute) a memory monitoring process 177-1 that indicates a percentage of memory being consumed by the currently created content. As the user 106 adds more and more video content 175, the memory monitoring process 177 can indicate remaining memory in the device. The content authoring environment can obtain the total amount of memory within the identified device 172 from a device profile 181 that corresponds to that device. The monitoring process 177-1 can indicate processor performance of the device 172 to allow the user 106 to estimate how processor-intensive the content 175 will be when played on the device 172. Further features and operations of the content authoring environment 140 will now be described using flow charts of processing steps that show example operations of the content authoring environment 140 as disclosed herein.

Figure 2:
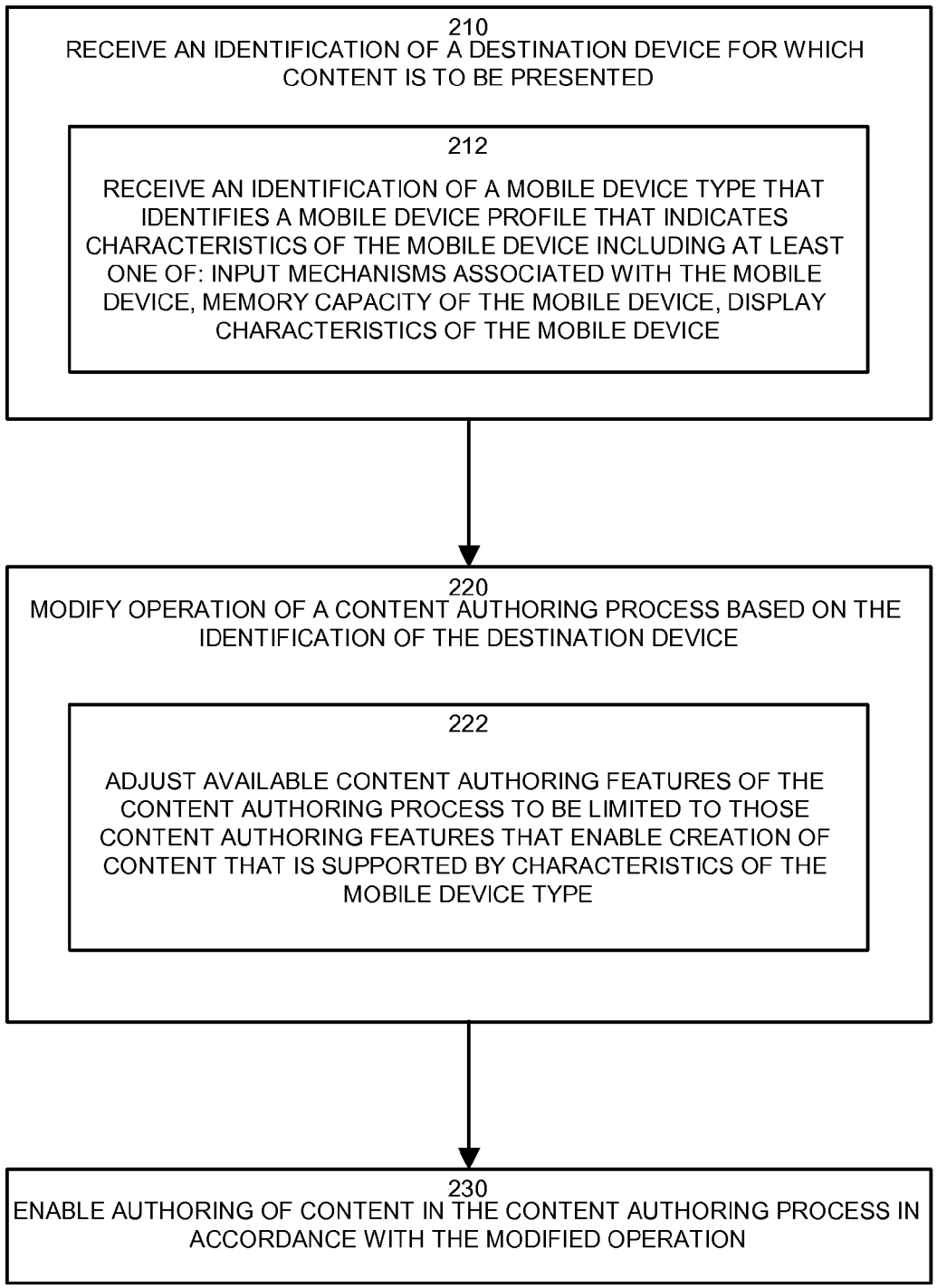
FIG. 2 is a flowchart illustrating an example method for authoring content for destination devices according to embodiments herein.

FIG. 2 is a flowchart of processing steps that the content authoring environment 140 performs to execute a content authoring process in accordance with example embodiments.

In step 210, the content authoring environment 140 receives an identification of a destination device 172 for which content is to be presented. By way of a non-limiting example, the destination device 172 can be a selection of a specific type (e.g. manufacturer and model number) of mobile phone, laptop, PDA, personal computer, etc. Also, by way of a non-limiting example, content authoring environment 140 can receive an identification of a destination device from a repository of destination devices (e.g. a list from a database of device profiles) when a user selects a device within a menu (as shown in the example FIG. 1), or from a destination device being connected to the computerized device 110 (e.g. a mobile phone being coupled via a universal serial bus (USB)), or via text entry into a text dialog box.

In step 212, the content authoring environment 140 receives an identification of a mobile device type (e.g. cell phone model number 123 made by XYZ cell phone company) that identifies a specific mobile device profile. The mobile device profile indicates characteristics of the mobile device. These characteristics can include input mechanisms associated with the mobile device, memory capacity of the mobile device, display characteristics of the mobile device and any other aspect of the device that might provide a limitation concerning how content can be presented or interacted with on the device. For example, a mobile device profile can include specifications of the mobile device, such as manufacturer, model, dimensions, and weight, memory capacity, screen size, keyboard or keypad type and specific keys used for input, available colors that can be displayed, processor speed, connectivity options, available data. Other profile characteristics can include: telecommunication carrier, operating software platform, data networks (GSM), available markets, languages, display dimensions, Flash or firmware version, screen modes, volume or other audio settings, image formats, and video playback capabilities.

In step 220, the content authoring environment modifies operation based on the identification of the destination device. Modifying operation of the content authoring environment changes the environment so that it is tailored to a selected mobile device. By way of a non-limiting example, the content authoring environment 140 modifies a graphical user interface 170 to provide authoring tools or features 173 that are compatible with the identified destination device 172. In another example, the content authoring environment 140 executes a background process (example 177 in FIG. 1) to monitor content authoring actions, or user 106, and provides immediate feedback in response to user actions. Following this example, if user 106 tried to scale or rotate otherwise playable video, yet the video is not capable of being scaled or rotated on the identified destination device, then content author 140 notifies user 106 that such scaling and rotation is not possible.

In step 222, the content authoring environment 140 modifies available content authoring features 173 to be limited to or adjusted to those content authoring features that enable creation of content 175 that is supported by characteristics of the mobile device type 172. For example, suppose a user 106 decides to create interactive video content 175 for a selected mobile telephone 172. The device profile 181 for the selected mobile telephone 172 indicates that soft key interactivity is supported, but that touch screen interactivity is not supported. As a result, content authoring features 173 to create touch screen interactive content do not appear as an option, or are not selectable in the graphical user interface 170, while content authoring features 173 for creating soft key accessible interactive content are accessible in the graphical user interface 170.

In step 230, the content authoring environment 140 enables authoring of content 175 in accordance with the modified operation of the content authoring environment. In other words, the content authoring environment 140 tailors its operation to the characteristics of an identified mobile device to provide an optimized editing and content creation system.

Figure 3:
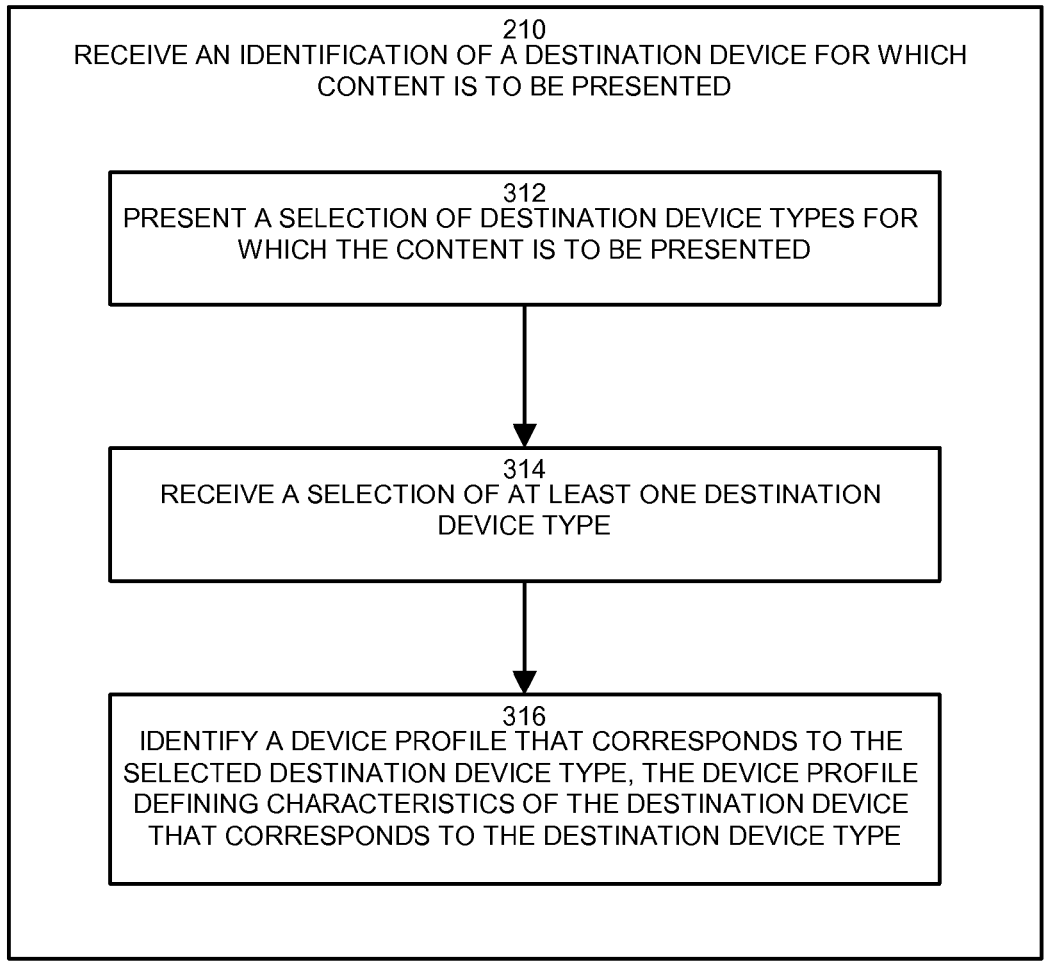
FIG. 3 is a flowchart illustrating an example method for authoring content for destination devices according to embodiments herein.

FIG. 3 is a flowchart of processing steps that the content authoring environment 140 performs in step 210 to receive identification of a destination device in accordance with example embodiments.

In step 210, the content authoring environment 140 receives an identification of a destination device 172 for which content is to be presented. Steps 312 to 316 provide details of this processing in accordance with an example embodiment.

In step 312, the content authoring environment 140 presents a selection of destination device types 172 for which the content is to be presented. For example, a drop-down menu displays a list of PDAs or mobile phones by manufacturer and model number. In an alternative embodiment, a device selection dialog box guides a user to select one or more destination devices. As explained above, an identification of a device and its associated device profile 181 can be achieved when the actual device (not shown in FIG. 1) is connected to the computerized device 110. In this example, the device profile 181 is actually stored in the device itself and the content authoring environment 140 queries the device upon connection of the device (e.g. via USB cable) (to the computerized device 110.

In step 314, the content authoring environment 140 receives a selection of at least one destination device type 172. For example, user 106 selects a mobile telephone made by XYZ Corporation having model number 123 as the identified destination device 172.

In step 316, the content authoring environment 140 identifies a device profile 181 that corresponds to the selected destination device type. The device profile 181 defines characteristics of the destination device that correspond to the destination device type. For example, in response to user 106 selecting an XYZ phone having model 123, the content authoring environment 140 loads a device profile 181 from a repository 180 of specifications of mobile telephones. By way of a non-limiting example, the device profile 181 could be in the form of an XML file.

Figure 4:
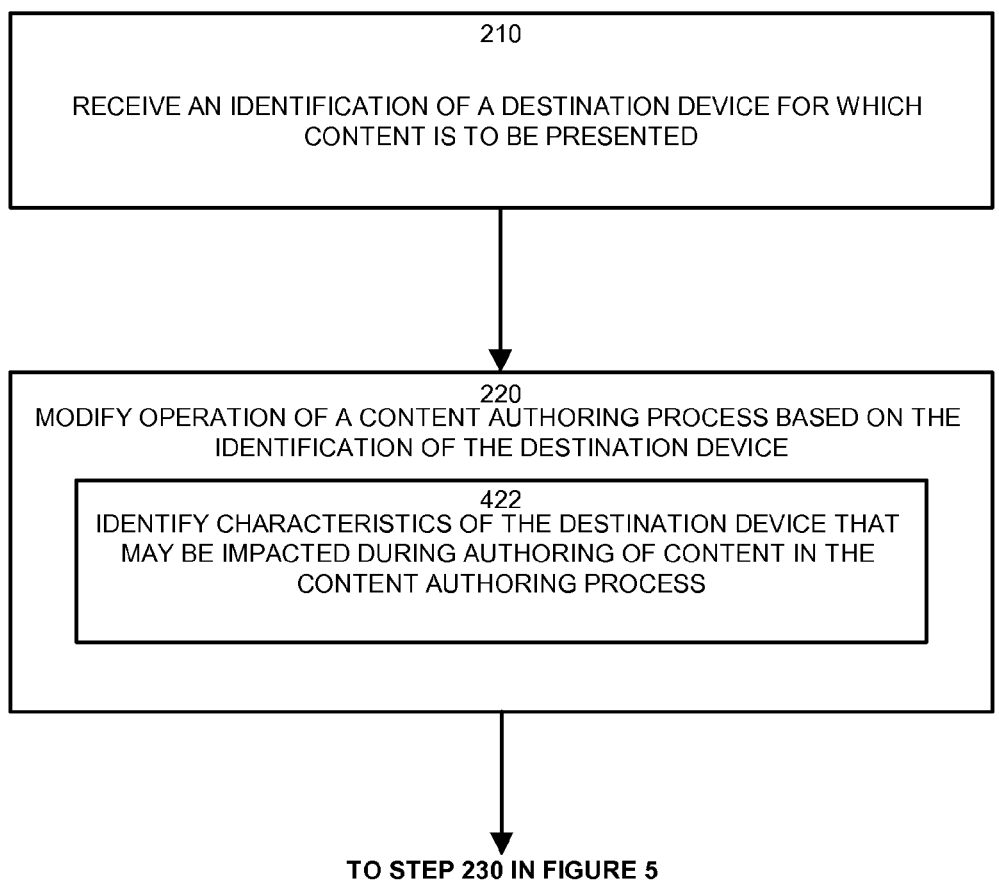
FIGS. 4-5 are a flowchart illustrating an example method for authoring content for destination devices according to embodiments herein.
Figure 5:
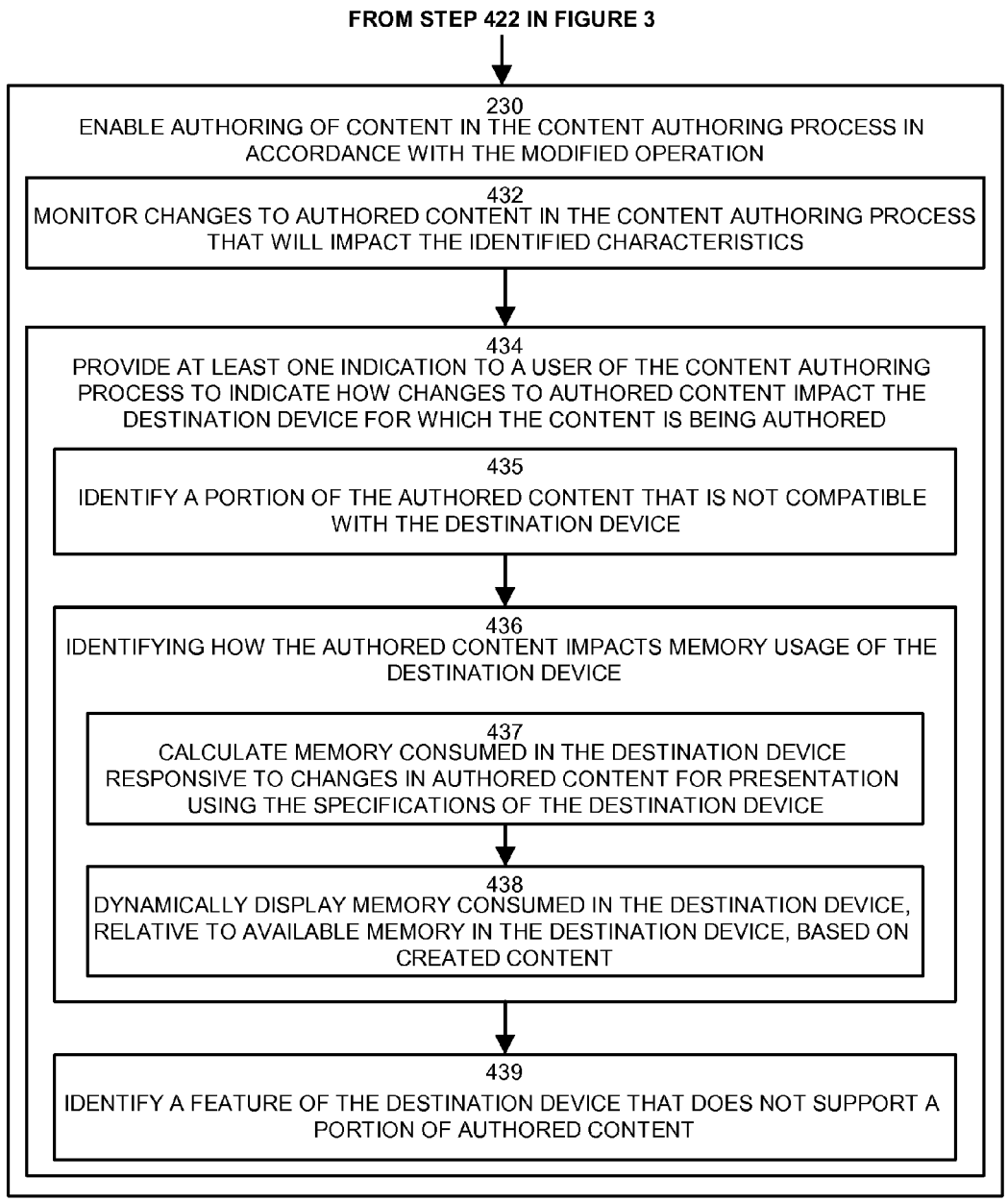

FIGS. 4 and 5 are a flowchart of processing steps that the content authoring environment 140 that demonstrate further details of processing in accordance with example embodiments.

In step 210, the content authoring environment 140 receives an identification of a destination device for which content is to be presented. In step 220, the content authoring environment 140 modifies its operation based on the identification of the destination device 172.

In step 422, the content authoring environment 140 identifies characteristics (e.g. from device profile 181) of the destination device 172 that may be impacted during authoring of content 175 in the content authoring environment. By way of a non-limiting example, the content authoring environment 140 displays a dashboard gauge 177 dynamically showing memory used by the destination device in response to changes (e.g. additions or deletions) in creative content 175. In another example, content author 140 displays a message to user 106 indicating that a particular screen mode is not capable of displaying parts of an animation sequence.

In step 230, the content authoring environment 140 enables authoring of content 175 in the content authoring process in accordance with the modified operation (i.e., in accordance with those features 173 that are customized based on the destination device type 172).

In step 432, the content authoring environment 140 monitors changes to authored content 175 in the content authoring process that will impact the identified characteristics. For example, the content authoring environment 140 runs a background process that continuously compares changes in authored content with a selected device specification or profile 181. The monitored changes can be compared to device characteristics obtained from the profile 181 such as available memory, processor speed, and the like.

In step 434, the content authoring environment 140 provides at least one indication (e.g. 177) to a user 106 of the content authoring process to indicate how changes to authored content 175 impact the destination device 172 for which the content 175 is being authored. Such an indication 177 can be a dashboard gauge, a dialog box, or a message bar that continuously provides feedback in response to content changes.

In step 435, the content authoring environment 140 identifies a portion of the authored content 175 that is not compatible with the destination device 172. For example, the content authoring environment 140 lists images from a video sequence in the content 175 that will not display or play properly on a selected PDA 172. In another example, the content authoring environment 140 provides a report detailing aspects of the content 175 that will not function properly on the destination device, or otherwise flags problem areas of the content 175.

In step 436, the content authoring environment 140 identifies (e.g. 177) how the authored content 175 impacts memory usage of the destination device. In step 437, the content authoring environment 140 calculates memory consumed in the destination device responsive to changes in authored content for presentation using the specifications of the destination device. In step 438, the content authoring environment 140 dynamically displays 177 memory consumed in the destination device, relative to available memory in the destination device, based on created content. As an example, the content authoring environment 140 displays a graphical bar or meter that displays memory used relative to memory capacity of the destination device.

In step 439, the content authoring environment 140 identifies a feature of the destination device 172 that does not support a portion of authored content. By way of example, the content authoring environment 140 indicates that the operating system of the destination device 172 does not support rotated images.

Figure 6:
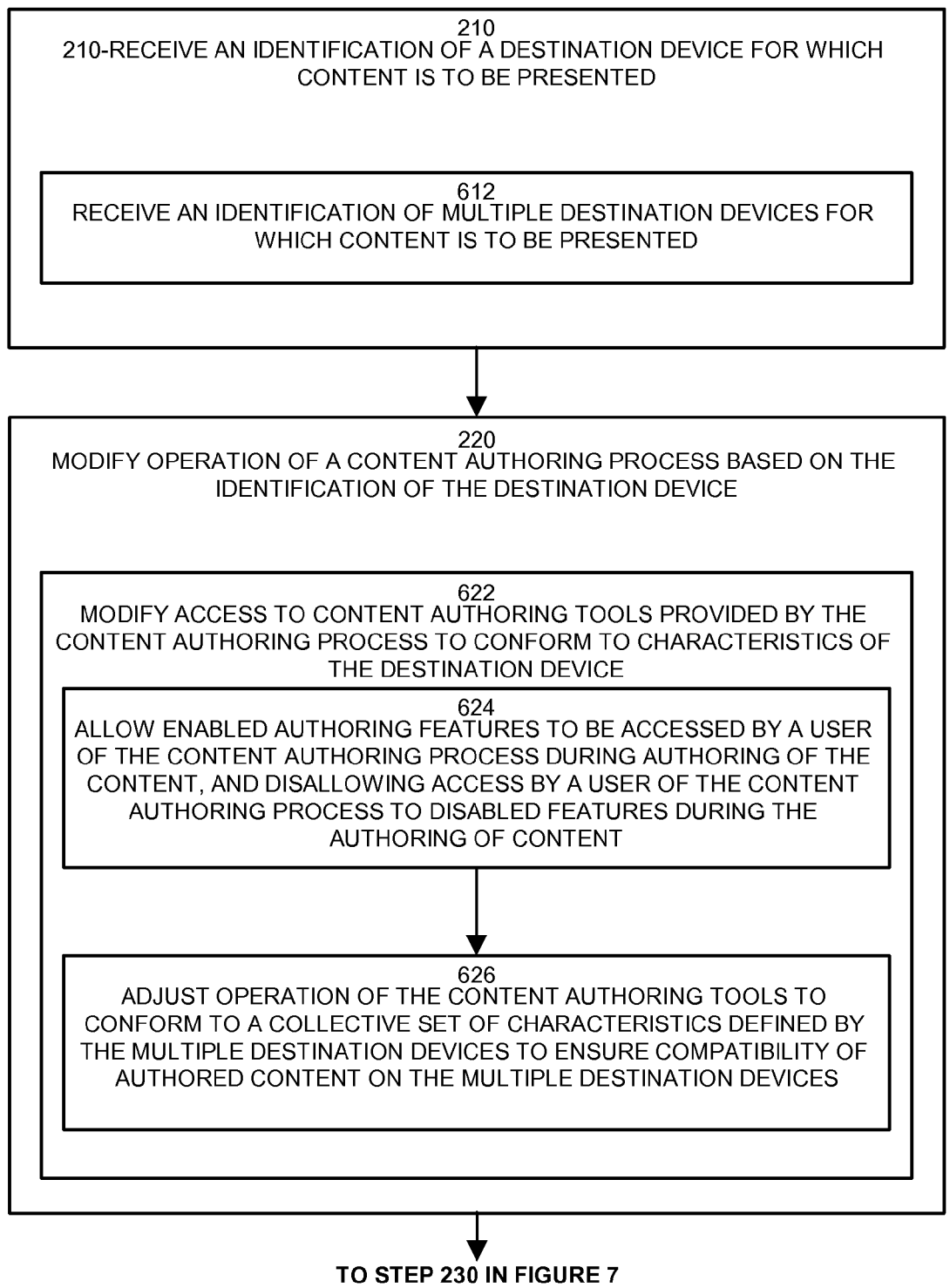
FIGS. 6-7 are a flowchart illustrating an example method for authoring content for destination devices according to embodiments herein.
Figure 7:
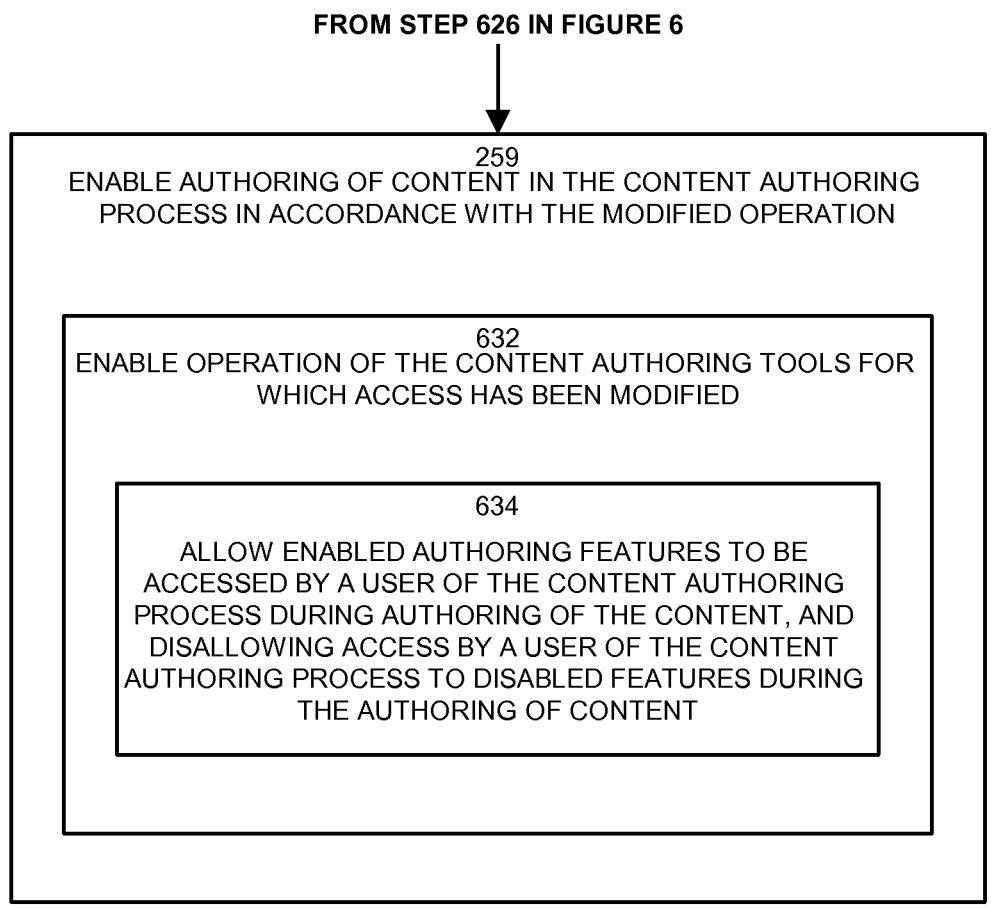

FIGS. 6 and 7 are a flowchart of processing steps that content author 140 performs in accordance with other example embodiments.

In step 210, the content authoring environment 140 receives an identification of a destination device 172 for which content 175 is to be presented.

In step 612, the content authoring environment 140 receives an identification of multiple destination devices (e.g. many selections 172 from the list 171) for which content 175 is to be presented. For example, the content authoring environment 140 presents a menu 171 of selectable mobile devices to user 106 and enables the user 106 to check a selection of several mobile devices for which the user/author 106 desires to create content 175.

In step 220, the content authoring environment 140 modifies operation of a content authoring process based on the identification of the destination device(s). Steps 622 through 626 show an example of this processing.

In step 622 the content authoring environment 140 modifies access to content authoring tools 173 to conform to characteristics of the selected destination devices. For example, the content authoring environment 140 identifies technical capabilities of each destination device, and constrains authoring features to be tailored to the collective set of destination device features for all selected devices 172. In another example, the content authoring environment 140 creates a file format or a scripting language, for created content, that corresponds to characteristics of the destination device(s). In another example, the content authoring environment 140 constrains tools or features 173 so that it is not possible to create content that exceeds a memory limit of any one of the selected destination devices.

In step 624, the content authoring environment 140 enables authoring features 173 to be accessed by a user 106 of the content authoring environment during authoring of the content 175, and disallows access by a user to disabled features during the authoring of content. There are several ways in which the content authoring environment 140 can modify access. For example, content authoring tools, not compatible with the capabilities of a given destination device (or a group of selected device), can be grayed out or not appear entirely or may be graphically marked with "Not compatible".

In step 626, the content authoring environment 140 adjusts operation of the content authoring tools 173 to conform to a collective set of characteristics defined by the multiple destination devices to ensure compatibility of authored content on the multiple destination devices. By way of a non-limiting example, suppose the user 106 desires to create content 175 for multiple different mobile phones. Such phones may have different network carriers, data networks, display dimensions, screen modes, and memory capacity. The content authoring environment 140 adjusts content authoring features 173 so that created content 175 can be presented properly on all of the multiple identified destination devices 172.

In step 230, the content authoring environment 140 enables authoring of content in accordance with the modified operation. In step 632, the content authoring environment 140 enables operation of the content authoring tools for which access has been modified.

In step 634, the content authoring environment 140 allows enabled authoring features 173 to be accessed by a user of the content authoring environment during authoring of the content 175, and disallows access by a user of the content authoring environment to disabled features 173 during the authoring of content 175. For example, if user 106 desired to create content 175 that activates a vibrate function on a mobile electronic device 172, but the mobile electronic device 172 is not capable of vibrating (as defined in the device profile 181 that corresponds to that device 172), then the content authoring environment 140 disallows any authoring feature 173 that adds vibration triggers to the authored content. In an additional example, content authoring environment 140 allows a user to specify alternative device behaviors. If a device does not support vibration, content authoring environment 140 plays a sound or causes a device screen to flicker. Such feedback is useful when authoring for multiple devices.

Figure 8:
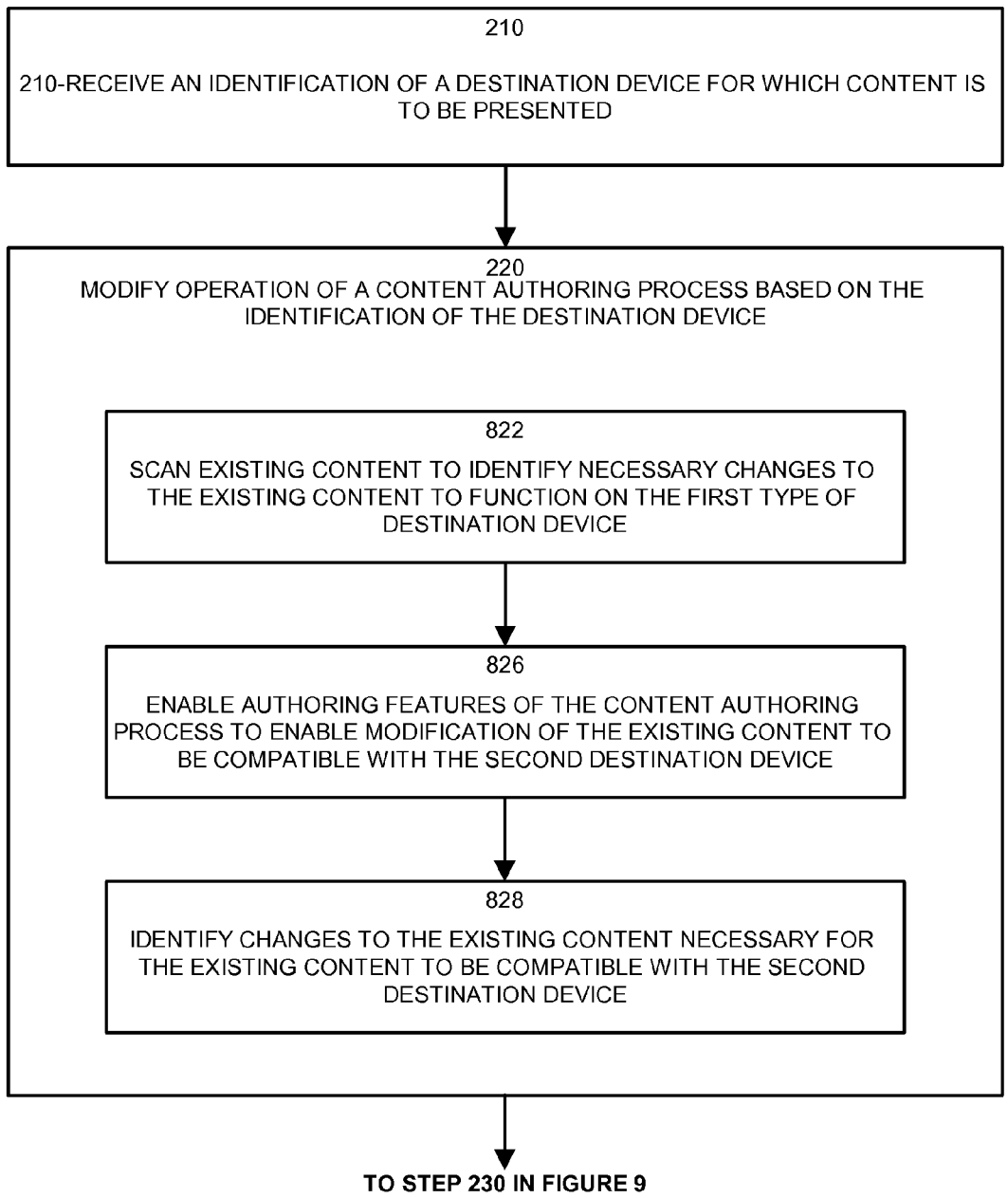
FIGS. 8-9 are a flowchart illustrating an example method for authoring content for destination devices according to embodiments herein.
Figure 9:
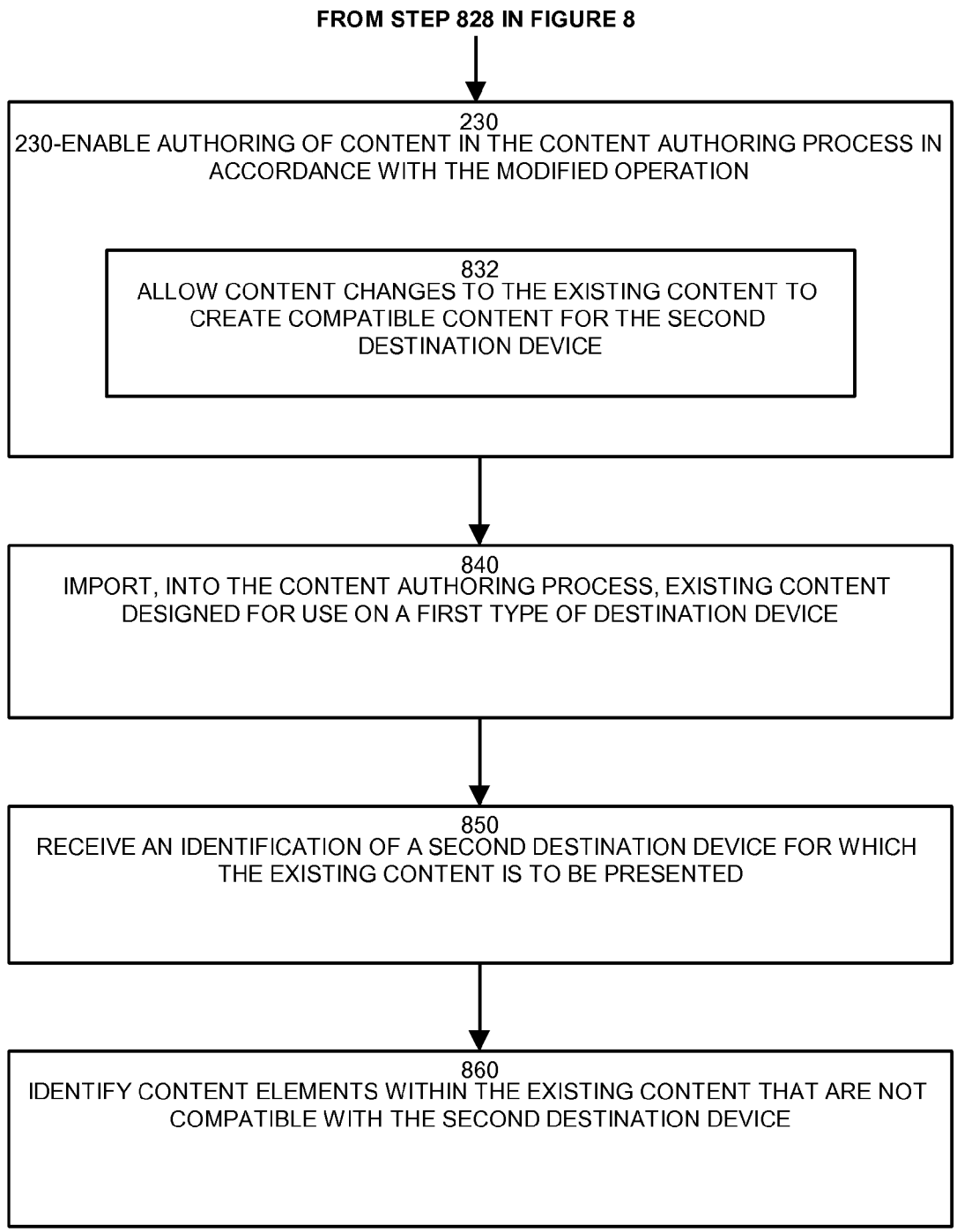

FIGS. 8 and 9 are a flowchart of processing steps that the content authoring environment 140 performs to execute a content authoring process in accordance with other example embodiments.

In step 210, the content authoring environment 140 receives an identification of a destination device 172 for which content 175 is to be presented.

In step 220, the content authoring environment 140 modifies operation of a content authoring process based on the identification of the destination device 172.

In step 822, the content authoring environment 140 scans existing content 175 (e.g. content 175 created by the user 106 without first specifying a device 172) to identify necessary changes to the existing content 175 to function on a first type of destination device 172. This process is useful when user 106 authors content not knowing the destination device 172 at the start of the authoring process. This process is also useful when user 106 authors content for a first destination device, and then desires the content to be compatible with a second destination device (e.g. content that was previously authored and saved to a file and designed for one device, and that the user 106 then reloads in the content authoring environment when continuing the authoring process or when preparing the content for presentation on another device). By way of a non-limiting example, the user 106 creates content for an XZY Corp. cell phone and then desires that the same content 175 is to be compatible with a ABC Corp. cell phone. In this example, the content authoring environment 140 compares existing content 175 with capabilities of a ABC selected cell phone from a device profile 181 for that phone (as opposed to the XYZ device profile for the XYZ phone for which the content was originally created), and then, via comparison of the second phone characteristics against features already present within the existing content 175, indicates changes for the user 106 to make so that the existing content 175 can be made compatible with the second ABC cell phone. Such changes can include, for example, protocols, video features, screen resolutions, audio capabilities, or any other feature embedded in the existing content that not supported by the newly identified phone. Such content features need to be changed to make the content 175 compatible with the presently selected device 172.

In step 826, the content authoring environment 140 enables authoring features 173 to enable modification of the existing content 175 to be compatible with the second destination device. For example if the existing content includes a WAV encoded sound file, but the destination device does not support this file format, then content authoring environment 140 enables a sound file editing tool to transform the sound file to MP3 format or to another format compatible with the destination device.

In step 828, the content authoring environment 140 identifies changes to the existing content 175 necessary for the existing content to be compatible with the second destination device. The content authoring environment 140 can identify such changes in various ways such as by providing a detailed report or list of changes that are necessary. Alternatively, the content authoring environment 140 provides a dialog box walk-through to assist user 106 to make necessary changes. In another example, the content authoring environment 140 can highlight portions of content 175 within the content 175 on the graphical user interface 170 that require adjustment or modification to be better presented on (or to be compatible with) the newly identified destination device 172.

In step 230, the content authoring environment 140 enables authoring of content in the content authoring process in accordance with the modified operation.

In step 832, the content authoring environment 140 allows content changes to the existing content 175 to create compatible content for the second destination device. In other words, the content authoring environment 140 allows user 106 to use authoring features or authoring tools to make the necessary content changes.

In step 840, the content authoring environment 140 imports, into the content authoring process, existing content designed for use on a first type of destination device. Such existing content can be previously created content, or content from a template. For example, the content authoring environment 140 imports a slideshow template.

In step 850, the content authoring environment 140 receives an identification of a second destination device for which the existing content is to be presented. This step is useful when, for example, the user 106 designs content 175 for a first destination device 172 (and this content 175 is then saved and deployed for use or presentation on the initial device), and then a new mobile electronic device enters the market.

In step 860, the content authoring environment 140 identifies content elements (e.g. specific features of the content, such as graphic resolutions, memory use, animation, support for certain software plug-ins, and the like) within the existing content that are not compatible with the second destination device. As explained above, the content authoring environment 140 can identify such content elements by way of a dialog box or a detailed report or can graphically highlight the features directly within the content 175. For example, if the content 175 is a web page for access by a PDA device and the web page content 175 includes a video playback region having video of a certain encoding type (e.g. MPEG4 encoding), upon importing the content 175 into the content authoring environment 140 for preparation of the same content for another PDA that does not support MPEG4 video playback (as indicated in the device profile 181 for the other device), the content authoring environment 140 can highlight the video playback region of the web page to indicate to the author 106 that there is a problem with this part of the content 175. When the user 106 mouses over that portion of the content 175 on the graphical user interface 170, a pop-up can appear indicating the video encoding scheme (MPEG4) as used for the current video content is not compatible with the currently identified destination device 172.

In other example embodiments, the content authoring environment 140 executes additional process steps. As an example, the content authoring environment provides feedback corresponding to how changed content will perform on the destination device, such as with a dialog box or scrolling message line, and responsive to changes in content for presentation, the content authoring environment continuously calculates memory that will be consumed in the destination device by authored content. In other configurations, the content authoring environment displays error messages in response to content changes not capable of being presented on the destination device. Further, responsive to receiving an identification of a second destination device, the content authoring environment identifies content elements that are not compatible with the second destination device, and identifies content changes necessary for the content to function on the second destination device. The content authoring environment imports existing multimedia content designed for use on a mobile electronic device, and identifies necessary changes to the existing multimedia content to function on the identified destination device. The content authoring environment can automatically modify a scripting language, associated with existing multimedia content, to provide content functional on the identified destination device. The content authoring environment can modify or configure the authoring environment such that it is not possible for a user to create content incompatible with the destination device.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A method comprising:
   receiving an identification of a destination device for which content is to be presented and identifying characteristics of the destination device;
   displaying a user interface of a content authoring process, the user interface displaying a plurality of authoring features available within the content authoring process configured to allow creation and modification of content within the content authoring process;
   modifying access to at least one of the plurality of authoring features based on the identification of the destination device;
   enabling authoring of content in the content authoring process in accordance with the modified at least one authoring feature;
   monitoring changes to authored content in the content authoring process associated with the identified characteristics and identifying at least one change to the authored content that is not compatible with the destination device; and responsive to identifying the at least one change that is not compatible with the destination device, generating and outputting a suggested modification of the at least one change to the authored content to create a modified portion of authored content that is compatible with the identified type of destination device.

2. The method of claim 1 wherein receiving an identification of a destination device for which content is to be presented comprises:
presenting a selection of destination device types for which the content is to be presented;
receiving a selection of at least one destination device type; and
identifying a device profile that corresponds to the selected destination device type, the device profile defining characteristics of the destination device that correspond to the destination device type.

3. The method of claim 1, wherein:
enabling authoring of content in the content authoring process in accordance with the modified at least one authoring feature further comprises:
providing at least one indication to a user of the content authoring process to indicate how changes to authored content impact the destination device for which the content is being authored.

4. The method of claim 3 wherein providing at least one indication to a user of the content authoring process comprises identifying how the authored content impacts memory usage of the destination device.

5. The method of claim 4, wherein identifying how the authored content impacts memory usage of the destination device comprises:
calculating memory consumed in the destination device responsive to changes in authored content for presentation using the specifications of the destination device; and
dynamically displaying memory to be consumed in the destination device, relative to available memory in the destination device, based on created content.

6. The method of claim 1, wherein modifying operation of at least one of the plurality of operations based on the identification of the destination device comprises:
wherein enabling authoring of content in the content authoring process in accordance with the modified at least one authoring feature of the authoring features comprises:
enabling operation of the at least one of the plurality of authoring features for which access has been modified.

7. The method of claim 1 wherein modifying access to at least one of the plurality of authoring features available within the content authoring process to conform to characteristics of the destination device comprises:
enabling or disabling at least one of the plurality of authoring features available within the content authoring process that correspond to features of content presentation that are supported by the destination device; and
wherein enabling authoring of at least one of the plurality of authoring features for which access has been modified comprises:
allowing enabled authoring features to be accessed during authoring of the content, and disallowing access to disabled authoring features during the authoring of content.

8. The method of claim 7, wherein receiving an identification of a destination device for which content is to be presented comprises:
receiving an identification of multiple destination devices for which content is to be presented;
and wherein modifying access to available authoring features within the content authoring process to conform to characteristics of the destination device comprises:
adjusting operation of the at least one of the plurality of authoring features to conform to a collective set of characteristics based on the multiple destination devices to ensure compatibility of authored content on the multiple destination devices.

9. The method of claim 1 comprising:
importing, into the content authoring process, existing content designed for use on a first type of destination device; and
wherein modifying access to at least one of the plurality of authoring features based on the identification of the destination device comprises:
scanning the existing content to identify necessary changes to the existing content to function on the first type of destination device.

10. The method of claim 9 comprising:
receiving an identification of a second destination device for which the existing content is to be presented;
identifying content elements within the existing content that that are not compatible with the second destination device;
and wherein modifying access to at least one of the plurality of authoring features comprises:
enabling authoring features of at least one of the plurality of authoring features to enable modification of the existing content to be compatible with the second destination device;
identifying changes to the existing content necessary for the existing content to be compatible with the second destination device; and
and wherein enabling authoring of content in the content authoring process in accordance with the modified at least one authoring feature comprises:
allowing content changes to the existing content to create compatible content for the second destination device.

11. The method of claim 1 wherein receiving an identification of a destination device for which content is to be presented comprises:
receiving an identification of a mobile device type, the identification identifying a mobile device profile that indicates characteristics of the mobile device including at least one of:
input mechanisms associated with the mobile device;
memory capacity of the mobile device;
display characteristics of the mobile device.

12. The method of claim 11 wherein modifying access to at least one of the plurality of authoring features based on the identification of the destination device comprises:
adjusting at least one of the plurality of authoring features of the content authoring process to be limited to those of the plurality of authoring features that enable creation of content that is supported by characteristics of the mobile device type.

13. The method of claim 1 wherein modifying access to at least one of the plurality of authoring features comprises:
enabling or disabling at least one of the plurality of authoring features available within the content authoring process that correspond to features of content presentation that are defined by characteristics of the destination device; and
wherein enabling authoring of content in the content authoring process in accordance with the modified at least one operation comprises:

allowing at least one of the plurality of authoring features to be accessed during authoring of the content, and disallowing access to disabled authoring features during the authoring of content.

14. The method of claim 13 wherein modifying access to at least one of the plurality of operations comprises:
comparing characteristics of the a mobile destination device as defined in a device profile associated with that mobile destination device with at least one of the plurality of authoring features and enabling or disabling at least one of the plurality of authoring features that allow creation of content that will be compatible with the characteristics of the mobile destination device.

15. The method of claim 14 wherein enabling authoring of content in the content authoring process in accordance with the modified access to at least one authoring features comprises:
responsive to changes in content for presentation, calculating memory that will be consumed in the destination device by the content; and
dynamically displaying memory that would be consumed in the destination device, relative to available memory in the destination device, based on current created content.

16. The method of claim 1, further comprising generating the modified portion of content according to the suggested modification.

17. A non-transitory computer readable storage medium having instructions encoded thereon that, when executed on a computerized device, cause the computerized device to perform operations comprising:
receiving an identification of a destination device for which content is to be presented and identifying characteristics of the destination device;
displaying a user interface of a content authoring process, the user interface displaying a plurality of authoring features available within the content authoring process configured to allow creation and modification of content within the content authoring process;
modifying access to at least one of the plurality of authoring features based on the identification of the destination device;
enabling authoring of content in the content authoring process in accordance with the modified at least one authoring feature;
monitoring changes to authored content in the content authoring process associated with the identified characteristics and identifying at least one change to the authored content that is not compatible with the destination device; and
responsive to identifying the at least one change that is not compatible with the destination device, generating and outputting a suggested modification of the at least one change to the authored content to create a modified portion of authored content that is compatible with the identified type of destination device.

18. The computer readable medium as in claim 17, wherein instructions that cause the computerized device to perform the operations of receiving an identification of a destination device for which content is to be presented include instructions that cause the computerized device to perform operations comprising:
presenting a selection of destination device types for which the content is to be presented;
receiving a selection of at least one destination device type; and
identifying a device profile that corresponds to the selected destination device type, the device profile defining characteristics of the destination device that correspond to the destination device type.

19. The computer readable medium as in claim 17, wherein instructions that cause the computerized device to perform operations enabling authoring of content in the content authoring process in accordance with the modified at least one authoring feature include instructions that cause the computerized device to perform operations comprising:
providing at least one indication to a user of the content authoring process to indicate how changes to authored content impact the destination device for which the content is being authored.

20. The computer readable medium as in claim 19, wherein instructions that cause the computerized device to perform the operation of receiving an identification of a destination device for which content is to be presented include instructions that cause the computerized device to perform operations comprising:
presenting a selection of destination device types for which the content is to be presented;
receiving a selection of at least one destination device type; and
identifying a device profile that corresponds to the selected destination device type, the device profile defining characteristics of the destination device that correspond to the destination device type.

21. The computer readable storage medium of claim 17, further comprising generating the modified portion of content according to the suggested modification.

22. A computer system comprising:
a memory;
a processor;
a display;
wherein the memory is encoded with an authoring environment application for authoring content for destination devices, and when executed in the processor, provides an authoring environment that performs the operations of:
receiving an identification of a destination device for which content is to be presented and identifying characteristics of the destination device;
displaying a user interface of a content authoring process, the user interface displaying a plurality of authoring features available within the content authoring process configured to allow creation and modification of content within the content authoring process;
modifying access to at least one of the plurality of authoring features based on the identification of the destination device;
enabling authoring of content in the content authoring process in accordance with the modified at least one authoring feature;
monitoring changes to authored content in the content authoring process associated with the identified characteristics and identifying at least one change to the authored content that is not compatible with the destination device; and
responsive to identifying the at least one change that is not compatible with the destination device, generating and outputting a suggested modification of the at least one change to the authored content to create a modified portion of authored content that is compatible with the identified type of destination device.

23. The system of claim 22, further comprising generating the modified portion of content according to the suggested modification.

\* \* \* \* \*